J. COXON.
VALVE.
APPLICATION FILED NOV. 21, 1918.

1,356,130.

Patented Oct. 19, 1920.
4 SHEETS—SHEET 1.

INVENTOR:
John Coxon
By Wm Wallace White
ATTY.

J. COXON.
VALVE.
APPLICATION FILED NOV. 21, 1918.
1,356,130.
Patented Oct. 19, 1920.
4 SHEETS—SHEET 2.
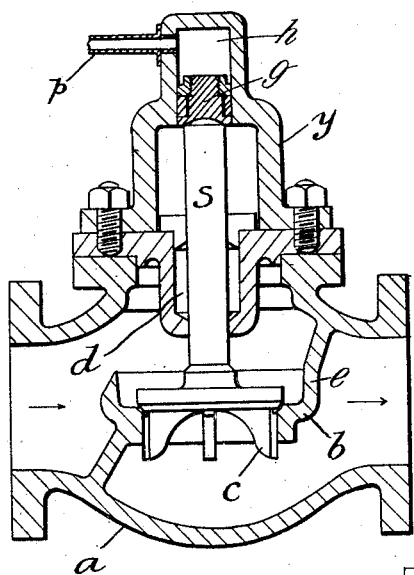
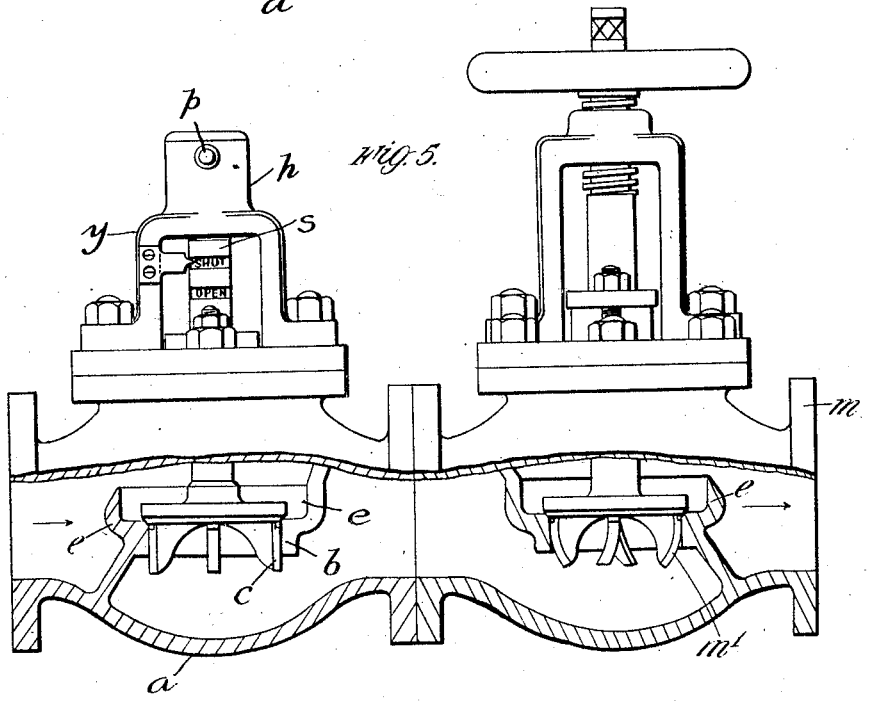
INVENTOR:
John Coxon
By Wm Wallace White
ATT'Y.

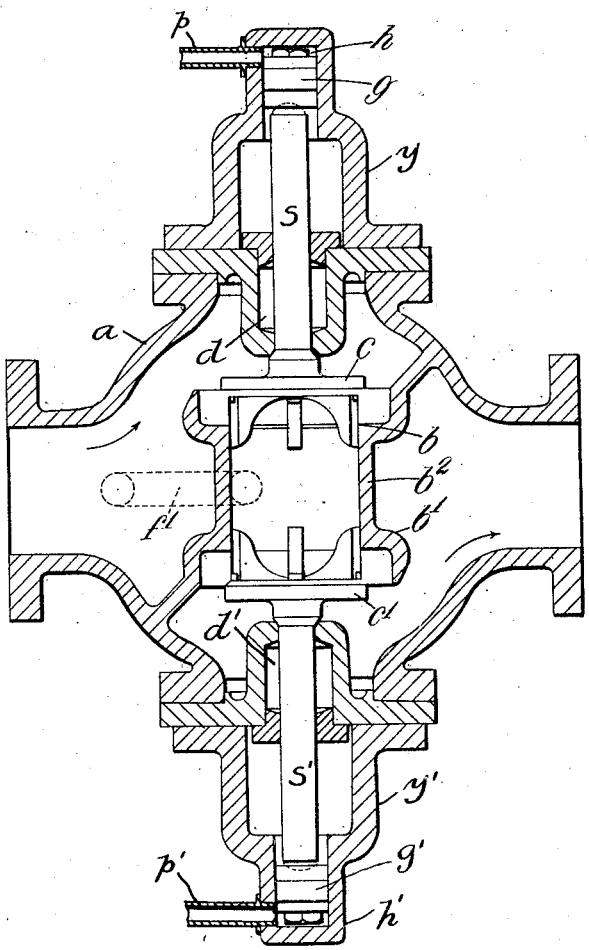

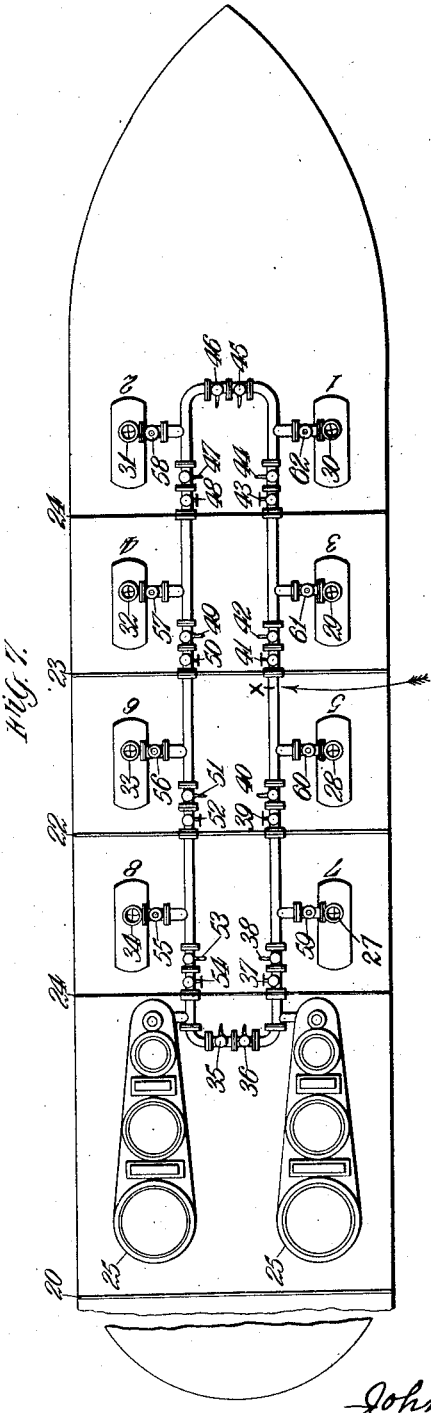

UNITED STATES PATENT OFFICE.

JOHN COXON, OF SUNDERLAND, ENGLAND.

VALVE.

1,356,130. Specification of Letters Patent. Patented Oct. 19, 1920.

Application filed November 21, 1918. Serial No. 263,508.

*To all whom it may concern:*

Be it known that I, JOHN COXON, of 13 Egerton street, Sunderland, in the county of Durham, England, have invented certain new and useful Improvements in or Relating to Valves, of which the following is a specification.

This invention relates to automatic safety stop valves, emergency valves, non-return valves and the like.

The object of this invention is to provide an improved valve or combination of valves of these types.

A valve made in accordance with this invention comprises in combination a casing, a valve seat in the casing, a valve adapted to rest on and be lifted off the seat, a spindle to the valve adapted to pass through a gland and packing, said spindle being on the side of the valve on which the pressure of the fluid acts, a by pass adapted to connect the passages on each side of the seat, the arrangement being such that the valve is lifted when the by pass is open.

A valve made in accordance with this invention may be used in combination with a stop valve or non-return valve of any known construction. The stem of the valve may be operated by a piston working in a cylinder and adapted to be closed by admission of steam in case of emergency or otherwise.

When used in combination with a stop valve the ordinary stop valve is placed between the valve and the boiler when used in combination with a non-return valve of ordinary construction it is placed so that the valve is adapted to be closed automatically when the ordinary valve would remain open and vice versa.

By varying the area of the valve spindle the valve can be made to close with any desired difference of pressure. The valve seat may be disposed in a cup so as to facilitate the closing of the valve.

Referring to the drawings filed herewith:

Fig. 3 is a section of a modified construction showing the stem operated by a piston.

Fig. 5 shows the application of the valve to an ordinary bulk head stop valve.

Fig. 6 is a section of a valve made in accordance with this invention adapted for use on the bulkheads and also on each end of steam pipe ring in place of the pairs of valves placed in the steam ring shown in Fig. 7.

Fig. 7 is a plan showing the invention applied to a battery of boilers in a vessel.

Figure 1:
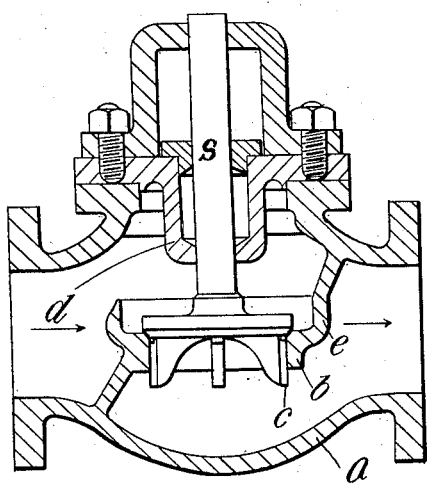
Figure 1 is a section of one form of valve made in accordance with this invention.
Figure 2:
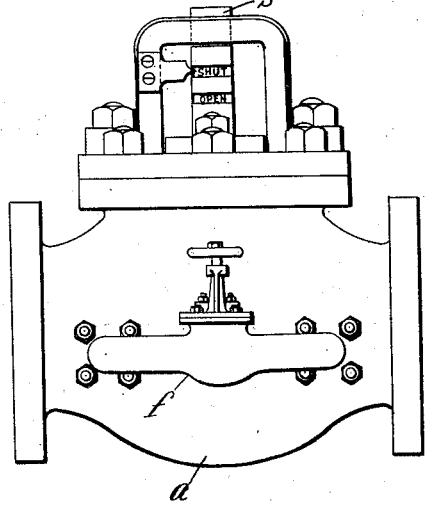
Fig. 2 is an elevation.

In Figs. 1 and 2, the casing $a$ is provided with a valve seat $b$ on which rests the valve $c$. The spindle $s$ of the valve passes through a gland $d$. The direction of the pressure is shown by the arrows. The valve seat is disposed in a cup shaped recess $e$. A by pass $f$ connects the passages on each side of the seat. In Fig. 3, the upper end of the stem or spindle $s$ of the valve $c$ bears against a piston $g$ disposed in a cylinder $h$ which is supported on the casing $a$ by means of flanged legs $y$, whereby the stem $s$ is normally open to atmosphere. The cylinder $h$ is connected by a pipe $p$ to a source of fluid pressure. To close the valve $c$ in case of emergency or otherwise steam is admitted to the cylinder $h$ above the piston $g$, which causes the piston to descend into contact with the top of the valve stem $s$ and force the same down and so close the valve, as shown in Fig. 3. Should the valve be closed it can be opened by admitting steam to the under side of the valve by the by pass $f$.

Figure 4:
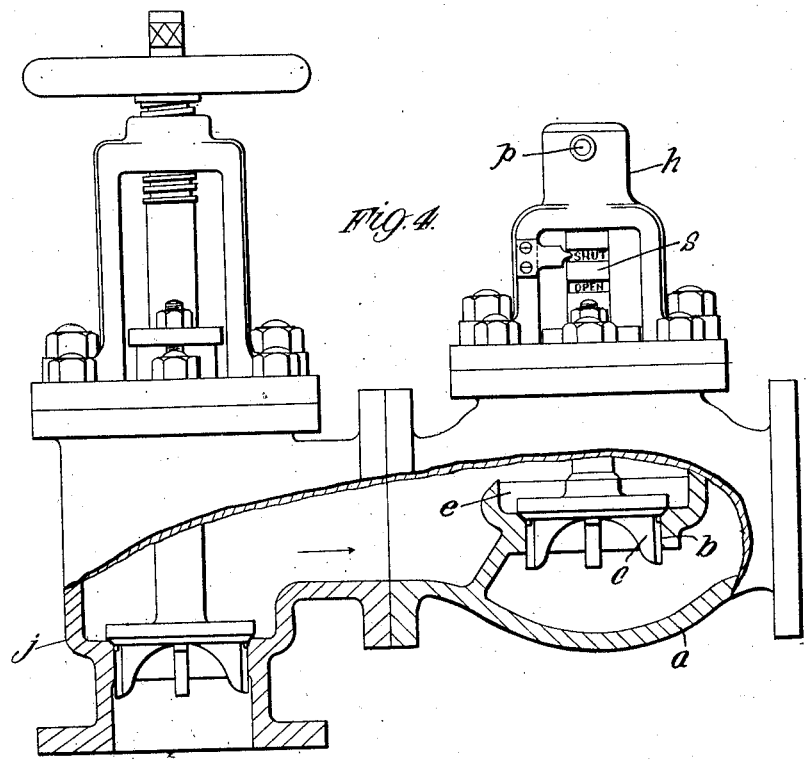
Fig. 4 shows the application of the valve in combination with the ordinary boiler stop valve.

In Fig. 4, the valve of Fig. 3 is shown in conjunction with a stop valve $j$ of ordinary construction, the pressure acting on the under side of the valve.

In Fig. 5, the valve of Fig. 3 is shown in conjunction with a stop valve $m$ adapted to be placed on the bulkheads of a vessel. The valve $m$ is provided with spiral shaped wings $m'$ to facilitate the closing of the valve as the steam in passing down through the valve strikes the wings and tends to close the valve.

In Fig. 6 there are two valves $c$ and $c'$ adapted to bear on valve seats $b$ and $b'$ disposed at opposite ends of a cylindrical valve case $b^2$ in the casing $a$. A by pass $f'$ is adapted to admit steam to the case $b^2$ between the valves. The stems or spindles $s$, $s'$ of the valves $c$, $c'$, after passing through the glands $d$, $d'$, extend into cylinders $h$, $h'$ respectively, which cylinders are supported by flanged legs $y$, $y'$ on the casing $a$ in a manner similar to that shown in Fig. 3, whereby the stems are normally open to atmosphere but are adapted to be acted on by pistons $g$, $g'$ carried within the cylinders $h$, $h'$. Should a burst occur on either side of the valve, one of the valves $c$ or $c'$ will close. To open the valve steam is admitted to the case $b^2$ by the by pass. To close the valve $c$ or $c'$ in case of emergency or otherwise steam is admitted to its respective cylinder $h$ or $h'$ through the pipes $p$ or $p'$ which connects it to a source of fluid pressure, whereupon the piston $g$ or $g'$ therein comes into engagement with and forces the stem $s$ or $s'$ inward to close the valve $c$ or $c'$.

In Fig. 7, 1, 2, 3, 4, 5, 6, 7 and 8 are boilers, 20, 21, 22, 23, and 24 are bulkheads, 25 and 26 are engines.

27, 28, 29, 30, 31, 32, 33, 34 are boiler stop valves.

37, 38, 39, 40, 41, 42, 43, 44 are automatic safety stop valves, 47, 48, 49, 50, 51, 52, 53, 54, are pairs of valves shown in Fig. 5.

35, 36, 45 and 46 are valves shown in Fig. 3 placed to operate in opposite directions. 55, 56, 57, 58, 59, 60, 61 and 62 indicate valves such as those shown in Fig. 3.

Should a steam pipe burst or be shot away say between bulkheads 22 and 23 at point $x$ indicated by arrow, the two automatic valves numbered 60 and 42 would close and also the bulkhead stop valve 39 would close on to its seat and prevent the escape of steam. The steam would then flow in the opposite direction from Nos. 1 and 3 boilers through valves 43, 44, 45, 46, into the other steam pipe thereby allowing the vessel to carry on with only the one boiler cut out.

Although I have specifically described the valve as a steam valve, it is to be understood that this valve may be used in systems employing oil, gas, or any other fluid.

What I claim as my invention and desire to secure by Letters Patent is:—

1. A valve comprising a casing, a valve seat in the casing, said casing being provided with a fluid inlet and a fluid outlet on opposite sides of said seat, a valve adapted to rest on said seat to close the valve, a spindle to said valve on the inlet side thereof, a gland in the casing through which said spindle passes, the outer end of said spindle being open to the atmosphere, the fluid passing through said valve in the direction in which the valve closes, said valve being held open without the aid of springs or pistons and solely by the pressure of the fluid passing normally through the valve by reason of the area of the inlet side of the valve on which the fluid acts being less by the area of the spindle than the area of the outlet side of the valve on which the fluid acts, said valve automatically closing immediately the pressure on the outlet side falls to a predetermined extent, the pressure on the inlet side tending to keep the valve closed after it has been closed, and a by-pass from the inlet to the outlet side of the valve normally closed but adapted to be temporarily opened to allow fluid to pass to the outlet side of the valve.

2. A valve comprising a casing, a valve seat in the casing, said casing being provided with a fluid inlet and a fluid outlet on opposite sides of said seat, a valve adapted to rest on said seat to close the valve, a spindle to said valve on the inlet side thereof, a gland in the casing through which said spindle passes, the outer end of said spindle being open to the atmosphere, said valve being held open without the aid of springs or pistons by the pressure of the fluid passing normally through the valve by reason of the area of the inlet side of the valve on which the fluid acts being less by the area of the spindle than the area of the outlet side of the valve on which the fluid acts, said valve automatically closing immediately the pressure on the outlet side falls to a predetermined extent, the pressure on the inlet side tending to keep the valve closed after it has been closed, a by-pass from the inlet to the outlet side of the valve normally closed but adapted to be temporarily opened to allow fluid to pass to the outlet side of the valve, a cylinder on the valve casing coaxial with the valve spindle, a piston in said cylinder adapted to bear on but not attached to the outer end of said spindle, and means for admitting fluid under pressure at will to said cylinder on the other side of the piston to the spindle to put pressure on said spindle to close the valve.

3. A valve comprising a casing provided with two orifices either of which is adapted to act as a fluid inlet and the other as a fluid outlet, a chamber in said casing, a valve seat at each end of said chamber, a valve adapted to rest on each seat to close the valve, a spindle to each valve on the side thereof farther from the other valve, glands in the casing through which said spindles pass, the outer ends of said spindles being open to the atmosphere, both valves being held open without the aid of springs or pistons by the pressure of the fluid passing normally through the valves by reason of the area of the spindle side of the valve on which the fluid acts being less by the area of the spindle than the area of the other side of the valve on which the fluid acts, either of said valves automatically closing immediately the pressure in the casing on the opposite side of said valve to its spindle falls to a predetermined extent the pressure on the spindle side of the valve tending to keep it closed after it has been closed, a by-pass from one side of one of said valves to the other side of said valve normally closed but adapted to be temporarily opened to allow fluid to pass from one side to the other of said valve, two cylinders on said casing coaxial with said valve spindles, a piston in each cylinder bearing on but not attached to the outer ends of said spindles, and means for admitting fluid under pressure at will to either of said cylinders on the other side of the piston therein to the spindle to put pressure on the spindle to close one of the valves.

4. A valve comprising a casing, a chamber in said casing, two valve seats in said chamber, said casing being provided with two orifices each adapted to act as an inlet or an outlet, two cylinders on said casing, a piston working in each cylinder, two valves each provided with a stem, adapted to rest on the seats to close the valves, the pressure of the fluid normally tending to keep one of the valves closed after it has been closed, one at a time only, the stems of the valves passing through glands in the casing into the cylinders and adapted to bear against the pistons, means for admitting steam to said cylinders, a by-pass from one side of one of the valves to the other side of said valve, said valve being adapted to be opened by pressure of the fluid on the outlet side of the valve when the by-pass is opened, and both valves being adapted to be held open when the fluid is normally passing through the valves in either direction without the aid of springs or pistons, one of said valves being closed by the pressure of the fluid, when the pressure on either side of the valve falls to a predetermined extent.

In testimony whereof I have signed my name to this specification.

JOHN COXON.